Aug. 5, 1969  J. W. HUDSON  3,459,530
PRODUCTION OF GRANULAR MAGNESIUM AMMONIUM PHOSPHATE
Filed Dec. 2, 1966
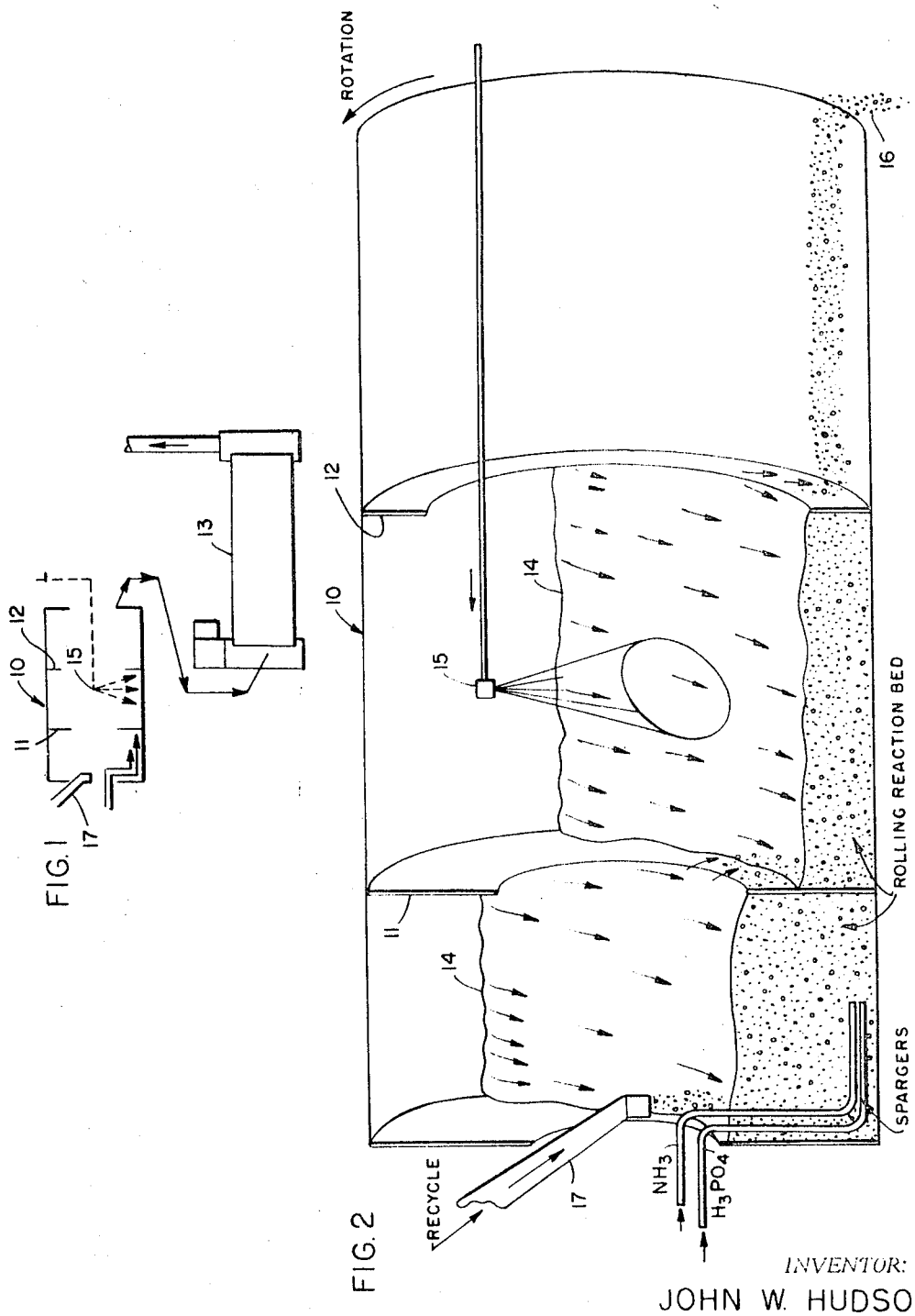
INVENTOR:
JOHN W. HUDSON
BY
Carl C. Batz
ATT'Y

United States Patent Office 3,459,530
Patented Aug. 5, 1969

3,459,530
PRODUCTION OF GRANULAR MAGNESIUM AMMONIUM PHOSPHATE
John W. Hudson, Atlanta, Ga., assignor, by mesne assignments, to USS Agri-Chemicals, Inc., Pittsburgh, Pa., a corporation of Delaware
Filed Dec. 2, 1966, Ser. No. 598,647
Int. Cl. C05b 9/00, 19/00
U.S. Cl. 71—33           5 Claims

ABSTRACT OF THE DISCLOSURE

A bed of magnesium ammonium phosphate granules is maintained in a rolling condition while introducing wet process phosphoric acid and ammonia beneath the rotating bed and while spraying a slurry of magnesium hydroxide over the bed so as to form alternate layers of monoammonium phosphate and magnesium hydroxide on the granules so that the layers may react at their interface to form magnesium ammonium phosphate.

---

This invention relates to the production of granular magnesium ammonium phosphate which is useful as a solid fertilizer.

Various processes for the manufacture of magnesium ammonium phosphate have been proposed, but such processes are slow because of the number and nature of the steps involved or require holding or aging periods which add to the cost of production. Magnesium ammonium phosphate is an excellent fertilizer material, but the high costs arising from difficult manufacturing procedures have restricted its use to high return crops or special uses.

I have discovered a process whereby magnesium ammonium phosphate can be made rapidly in high yield using a relatively simple, single-step process, and the ingredients used to make the product are wet process phosphoric acid, ammonia, and magnesium hydroxide.

A primary object, therefore, of the invention is to provide a process wherein magnesium ammonium phosphate can be prepared at relatively low cost in a simple, single-step process. A further object is to provide a process in which phosphoric acid, ammonia, and magnesium hydroxide are utilized to form alternate thin layers of monoammonium phosphate and magnesium hydroxide on the magnesium ammonium phosphate starting material whereby the phosphate and hydroxide react at the interface between layers on each granule to form magnesium ammonium phosphate, and the heat of reaction is utilized for accelerating the drying rate and reducing the amount of heat necessary for drying. Yet another object is to provide a process and product in which the granule of recycled magnesium ammonium phosphate is coated with alternate layers of monoammonium phosphate and magnesium hydroxide and the granule size is controlled by the number of passes of each granule through the granulation zone. A still further object is to provide a process in which such layered granules are formed in spherical, strong granule structures. Other specific objects and advantages will appear as the specification proceeds.

The invention is shown, in an illustrative embodiment, by the accompanying drawing, in which:

FIG. 1 is a schematic layout of apparatus in which the invention may be practiced; and FIG. 2, an enlarged, part-sectional view of a rotating drum in which the granules are coated with monoammonium phosphate and magnesium hydroxide.

In the illustration given, 10 designates a drum mounted for rotation and provided with annular partitions 11 and 12. The granular overflow product from vessel 10 may be passed to a dryer 13 to complete the drying of the product. Since both vessels 10 and 13 are of well-known construction, a further detailed description is believed unnecessary.

In the operation of the process, wet process phosphoric acid and ammonia are introduced, preferably through spargers, underneath a rolling bed 14 of recycled magnesium ammonium phosphate in the reaction zone of the drum granulator 10. A slurry of about 35 percent magnesium hydroxide in water is sprayed onto the top of the moving solids bed 14 through a spray nozzle 15, as shown best in FIG. 2. The spray nozzle may be located in the first compartment directly over the spargers or it may be located, as shown in FIG. 2, in the second compartment over the rolling bed 14 in this compartment. Each ingredient is fed in stoichiometric proportions to yield a 1:1:1 ratio of $Mg^{++}:NH_4^+:PO_4^\equiv$. Alternate thin layers of monoammonium phosphate and magnesium hydroxide are formed in successive stages as the particles pass through the reaction zone. The monoammonium phosphate and magnesium hydroxide react at the interface between layers on each granule to form $MgNH_4PO_4 \cdot (H_2O)_x$. Reacting the raw materials as the granules form conserves the heat of reaction for accelerating the drying rate and reducing the amount of additional heat necessary for drying. The granular product 16 issuing from the outlet end of the granulator drum 10, as shown in FIG. 2, may be recycled in part to the recycle inlet pipe 17 and in part passed to the dryer 13.

The order of addition and the method of combining the reactants are important. Wet process phosphoric acid and anhydrous ammonia are sparged underneath a bed of recycled solids in the drum granulator. Stoichiometric quantities of these raw materials form monoammonium phosphate which coats the recycle in a thin layer.

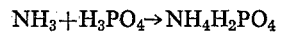
$$NH_3 + H_3PO_4 \rightarrow NH_4H_2PO_4$$

Magnesium hydroxide slurry (35% solids) is sparged on top of the rolling bed, forming another thin layer. Thus, alternate layers of monoammonium phosphate and magnesium hydroxide are formed in successive passes of recycled material through the granulator. Reaction at the interface between layers forms magnesium ammonium phosphate.

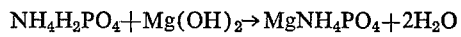
$$NH_4H_2PO_4 + Mg(OH)_2 \rightarrow MgNH_4PO_4 + 2H_2O$$

Granule size can be controlled by the number of passes each granule is permitted through the granulation zone. Product screens may be adjusted to produce granules in any common size such, for example, as $-4+6$, $-6+8$, $-6+16$, and $-16$ mesh.

As stated above, the process may be carried out in a single section drum granulator in which the wet process phosphoric acid and ammonia are sparged underneath the rolling bed of ammonium phosphate while a slurry of magnesium hydroxide is sprayed on top of the moving solids bed. If the process is carried on in two sections, as illustrated by FIG. 2, the sparging of the phosphoric acid and ammonia is accomplished in the first section, and the spraying of the magnesium hydroxide slurry in water is accomplished in the second section. In either operation, alternate thin layers of monoammonium phosphate and magnesium hydroxide are formed in successive stages as the particles pass through the reaction zone.

In the initial start-up, using either the one-section or two-section drum granulator, I employ a granulated recycle magnesium ammonium phosphate. The granular recycle starting material initially may be prepared by pulverizing a mixture of diammonium phosphate and magnesium oxide in stoichiometric proportions to yield a 1:2:1 $Mg:NH_4:PO_4$ ratio. This mixture is granulated with steam and water in the drum granulator. The second $NH_3$ group is driven off when steam and water are added.

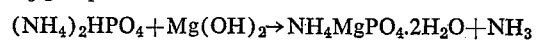
$$(NH_4)_2HPO_4 + Mg(OH)_2 \rightarrow NH_4MgPO_4 \cdot 2H_2O + NH_3$$

After the recycle solids have been through the granulator and dryer once, the particles were granular enough to act as nuclei for the formation of the desired product.

The slurry of magnesium hydroxide contains preferably about 35 percent of magnesium hydroxide and 65 percent water. The water content should be less than 70 percent and more than 60 percent, the preferred proportion being 65 percent.

The recycle ratio is not critical. It may be varied as desired. Normally the ratio is varied from 1.5 to 4.0. At lower recycle rates, the layers of reactants in the granule skin are thicker. Higher recycle ratios produce a more uniform particle appearance. Granules formed by the process are spherical, smooth and uniform in appearance.

Specific examples illustrative of the invention may be set out as follows:

Example I

A recycle granular material was prepared by pulverizing a mixture of diammonium phosphate and magnesium oxide in stoichiometric proportions to yield a

$1:2:1 Mg:NH_4:PO_4$ ratio. This mixture was granulated with steam and water in the drum granulator. The second $NH_3$ group was driven off when steam and water were added.

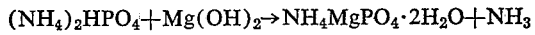

$(NH_4)_2HPO_4 + Mg(OH)_2 \rightarrow NH_4MgPO_4 \cdot 2H_2O + NH_3$

After the recycle solids had been through the granulator and dryer once, the particles were granular enough to act as nuclei for the formation of the desired product.

After a rolling bed of granular recycle material had formed in the granulator, ammonia and phosphoric acid were sparged under the bed, forming monoammonium phosphate in place. The heat of reaction served to raise the temperature of the reaction bed and to drive off excess water. A spray nozzle giving a hollow cone spray pattern was directed over the bed in the first section of the granulator drum and directly over the spargers, the spray striking the bed and forming a magnesium hydroxide coating. Alternate layers of monoammonium phosphate and magnesium hydroxide slowly were formed on each granule with reaction occurring at the interface between layers of reactants. The temperature of the reaction zone reached 195–200° F. A recycle ratio of 1.5 resulted in the formation of some over-size material, and layers of reactants in the granule skin were thicker at this low recycle rate. At a higher recycle rate of about 4.0, a more uniform particle product was obtained. The production rate depended upon the speed at which the product could be dried. At the 50 lb./hr. rate, the −6+8 mesh product could be dried to 2 percent free water when held 25 minutes in the dryer 13. Under similar drying conditions, 100 lb./hr. product could be dried to 6 percent free water when held for 12 minutes in the dryer.

Example II

The process was carried out as described in Example I except that the phosphoric acid and ammonia were sparged under the bed in the first granulator section (12 in. long and 6 in. deep), forming a monoammonium phosphate layer on each granule and the coated granules continuously spilled over into the next section, as shown best in FIG. 2, forming a bed 18 in. long by 3 in. deep, and the 35 percent magnesium hydroxide slurry in water was sprayed on top of the rolling bed in the second section. Granules entering the second section were wet and sticky. When sprayed with the magnesium hydroxide slurry, the granules became hotter and dryer, and then separated, forming a mass of flowing individual granules. Granules formed by this method were uniform in appearance, spherical, and smooth. A recycle ratio of 4.0 was used and was found to be better than the recycle ratios of 1.5–2.0. The reaction temperature did not exceed 160° F. in either section, even though the recycle ratios were varied from 2.0 to 5.0.

As illustrated by the foregoing examples, the process is essentially a one-step process in which the introduction of ammonia and wet process phosphoric acid in the bottom of the rolling bed of magnesium ammonium phosphate and the spraying of magnesium hydroxide on the top of the rotating bed, whether in the first section or second section of the granulating drum, brings about an alternate coating of the granular magnesium ammonium phosphate with thin layers of monoammonium phosphate and magnesium hydroxide, these layers subsequently reacting at the interface to form magnesium ammonium phosphate. By recycling the product, successive alternate layers of these reactants can be formed and the heat of reaction is conserved to aid in drying, minimizing the fuel requirements for drying. The product can readily be controlled to yield the desired granule size by adjusting the product screens. The least expensive raw materials can be employed, namely, anhydrous ammonia, wet process phosphoric acid, and magnesium hydroxide derived from sea water.

While in the foregoing specification, I have set out specific procedures in considerable detail for the purpose of illustrating embodiments of my invention, it will be understood that such details may be varied widely by those skilled in the art without departing from the spirit of my invention.

I claim:

1. In the preparation of a composite granule, the steps of rolling a bed of magnesium ammonium phosphate granules, and introducing wet process phosphoric acid and ammonia underneath said rolling bed while spraying a slurry of magnesium hydroxide, in which the water content is between 60 and 70 percent, on top of said rolling bed to form alternate layers of monoammonium phosphate and magnesium hydroxide whereby said layers react at their interface to form magnesium ammonium phosphate.

2. The process of claim 1 in which the magnesium hydroxide comprises about 35 percent by weight in water.

3. The process of claim 1 in which said granules coated with alternate layers of monoammonium phosphate and magnesium hydroxide are recycled to form multi alternate layers of said phosphate and hydroxide on said granules.

4. The process of claim 1 in which said rolling bed of granular magnesium ammonium phosphate is moved progressively through a first and second compartment of a granulating drum and said wet process phosphoric acid and ammonia are sparged underneath said rotating bed in said first compartment and said magnesium hydroxide slurry is sprayed upon said bed in said second compartment.

5. A composite granule consisting of smooth, spherical layered granules, each having a solid core of magnesium ammonium phosphate coated with alternate layers of monoammonium phosphate and magnesium hydroxide whereby said layers are reacted at their interface to form magnesium ammonium phosphate.

References Cited
UNITED STATES PATENTS

| | | | |
|---|---|---|---|
| 3,240,586 | 3/1966 | Harris | 71—64 X |
| 3,392,007 | 7/1968 | Christoffel et al. | 71—33 |
| 3,320,048 | 5/1967 | Legal et al. | 71—42 |

OSCAR R. VERTIZ, Primary Examiner

A. GREIF, Assistant Examiner

U.S. Cl. X.R.

71—36, 42, 64